United States Patent [19]

Boyer

[11] Patent Number: 5,269,171

[45] Date of Patent: Dec. 14, 1993

[54] PROPANE GAS LEAK DETECTION

[75] Inventor: Terrence M. Boyer, Liberty, Mo.

[73] Assignee: Ferrellgas, Inc., Liberty, Mo.

[21] Appl. No.: 869,016

[22] Filed: Apr. 15, 1992

[51] Int. Cl.⁵ .......................................... G01M 3/32
[52] U.S. Cl. ................................................ 73/40.5 R
[58] Field of Search ................................... 73/40.5 R

[56] References Cited

U.S. PATENT DOCUMENTS

| | | |
|---|---|---|
| 2,043,227 | 6/1936 | Bennett .................... 73/40.5 R X |
| 3,269,410 | 8/1966 | Alvarado et al. . |
| 3,444,724 | 5/1969 | Gilpin . |
| 3,521,481 | 7/1970 | Tyrone ............................... 73/40.5 |
| 3,756,072 | 9/1973 | MacMurray . |
| 4,043,355 | 8/1977 | Cerruti et al. . |
| 4,068,522 | 1/1978 | Poe . |
| 4,895,018 | 1/1990 | Asbra . |
| 4,984,448 | 1/1991 | Jordan et al. . |
| 4,998,434 | 3/1991 | Asbra . |

FOREIGN PATENT DOCUMENTS 2541985  3/1977  Fed. Rep. of Germany ... 73/40.5 R
247224 10/1987  Japan .............................. 73/40.5 R Primary Examiner—Hezron E. Williams
Assistant Examiner—Joseph W. Roskos
Attorney, Agent, or Firm—Litman, McMahon & Brown

[57] ABSTRACT

A propane gas leak detection method includes permanently installing a test adapter unit in a line between a propane gas service valve unit and a first regulator and an adapter fitting in a pressure gauge receptacle of the service valve unit, temporarily connecting a flowmeter to the adapters, closing the service valve unit to bypass gas through the flowmeter, observing the rate of gas flow on the flowmeter, and disconnecting the flowmeter from the adapters after the gas leak test. The invention provides variations in the test adapters for use with service valve units having differing types of fittings and receptacles available.

26 Claims, 3 Drawing Sheets

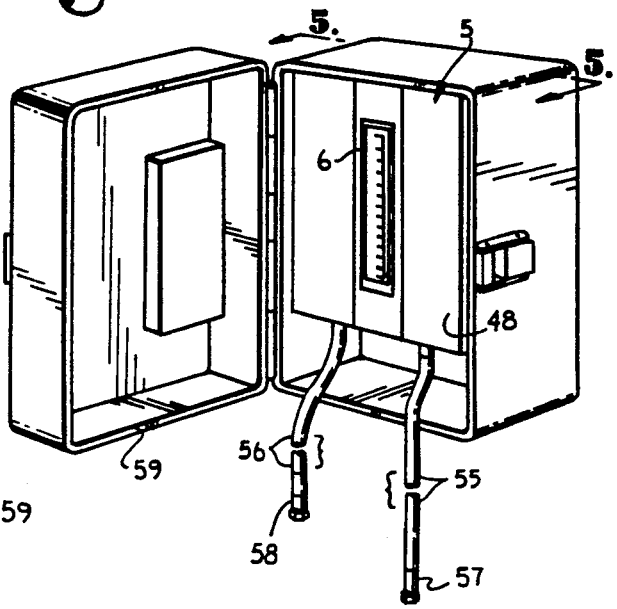
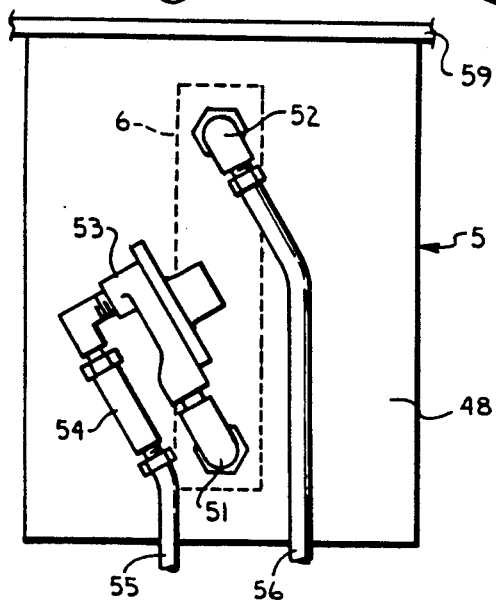
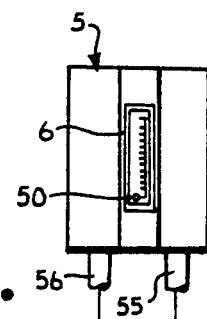
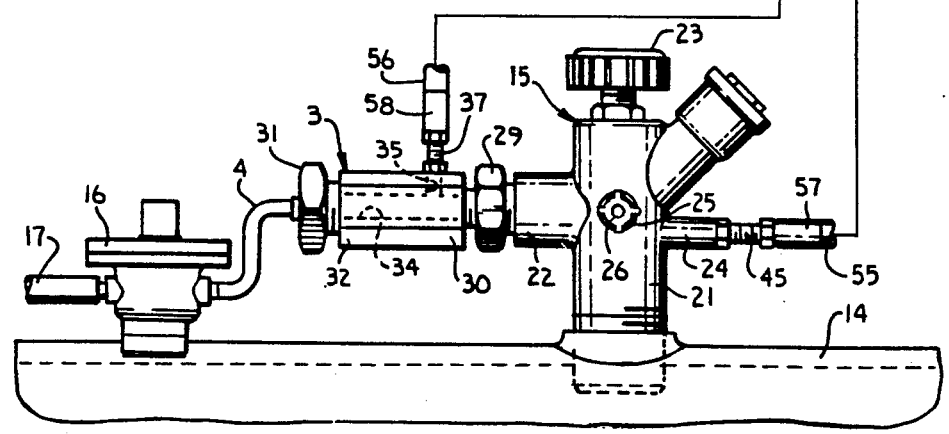

PROPANE GAS LEAK DETECTION

FIELD OF THE INVENTION

The present invention relates gas leak detection in propane gas systems and, more particularly, to such detection employing a permanently installed test adapter apparatus in cooperation with a calibrated flowmeter temporarily connected to the test adapter.

BACKGROUND OF THE INVENTION

The propane gas industry has traditionally used two methods for the determination of gas leakage in the piping of a propane system. The first method involves the placement of a high pressure test block in the high pressure section of the propane system immediately upstream of a first stage regulator. Gas is introduced into the system, and a 300 psig (pounds per square inch, gauge) pressure gauge is monitored for a period of ten minutes. If a drop in pressure is noted by the technician, a leak is considered to be present downstream of the test section. If the pressure gauge holds steady, no leak is present.

The second method used by the industry is a low pressure method which employs a water manometer. The manometer is connected to the low pressure section of the delivery system, typically, at a gas range orifice inside of the residence. After the manometer is installed, the technician monitors the water column level for three minutes. If there is a decrease in water column height, gas leakage is determined to be present in the system. This method requires that the technician have access to the inside of the house and that all known gas flows, such as free-standing pilot lights, be shut off.

The above described tests, although accurate for determining the existence of leaks, involve a moderately high level of skill from the technician and are very time consuming. On the average, a typical test requires at least twenty minutes. Productivity suffers to a great extent if a delivery person has several gas outage calls in a single day. Additionally, these tests cannot quantify the leak rate; they can only inform the delivery person that a leak is present.

Propane gas outages call for special attention by the delivery person to ensure that there are no unacceptable and dangerous leakages in the system. In most cases, propane gas outages simply involve the customer running out of gas because of failure to order a gas delivery or through other circumstances that do not relate to gas leakages. However, the propane industry has adopted a standard of care in which a gas leakage test is generally performed after all gas outages. Because the conventional methods of testing for propane gas leaks are complicated and time consuming, a test procedure that allows for quick and precise determination of leakage in a propane gas system following a gas outage is desirable.

SUMMARY OF THE INVENTION

The present invention is directed to convenient, efficient, and precise methods and apparatus for detecting gas leaks in gas service installations. In general, the invention comprises the permanent installation of a test adapter or adapters in the gas supply line, temporary connection of a calibrated flowmeter to the adapters, bypassing gas through the flowmeter, observation of the gas flow rate after the service installation has been charged with gas, and disconnection of the flowmeter from the adapter after the gas leak test. If leakage in excess of a predetermined rate is detected, the technician may undertake whatever measures are appropriate to find and secure such leaks.

The present invention is particularly directed to the use, with liquefied petroleum supply systems, such as propane, of gas testing for the possibility of supply exhaustion. In a preferred embodiment of the invention, a test adapter block is connected in the supply line between a service valve on the propane tank and the first pressure regulator in the system. The test adapter block includes a meter outlet fitting having a Schrader type valve therein, which is of the type which are normally used in tire valve stems. A similar meter inlet fitting is installed in a pressure gauge receptacle on the service valve unit. The pressure gauge receptacle normally communicates directly with the contents in the propane tank.

The flowmeter has an inlet hose and an outlet hose, which are adapted to be threaded respectively onto the meter inlet and outlet fittings in such a manner as to open the Schrader valves therein. The flowmeter is preferably of the rotameter type, including a calibrated transparent metering tube with a float member which is moved against gravity by the flow of gas through the metering tube to indicate the rate of flow therethrough. The flowmeter unit includes a pressure regulator and a gas filter.

When the flowmeter is connected, the service installation is charged with gas through the flowmeter, and when steady state conditions have been established, the float in the flowmeter indicates the flow rate of gas through the flowmeter. Gas appliances such as furnaces and water heaters usually incorporate thermocouple controlled pilot valves. Once the pilot has been extinguished and the thermocouple has cooled, the gas control valve closes and stops the flow of gas to the pilot. Some gas ranges use so-called free standing pilots which are not controlled by thermocouple devices. However, the rate of leakage from free standing pilots is generally not considered to be hazardous. If the technician detects flow rates consistent with the presence of free standing pilots, the gas service installation is probably safe, and the system can be restored to normal service. However, if flow rates exceeding that of free standing pilots is measured, excessive leakage is indicated. In such a case, the technician must secure the service valve to prevent gas use by the customer until the system abnormality is diagnosed and repaired. In either case, the flowmeter is disconnected from the adapter(s), which closes the Schrader valves in the inlet and outlet adapter fittings.

Apparatus for practicing the method of the present invention includes a variety of test adapters to accommodate variations in the service valves and piping of propane installations. The preferred embodiment of the apparatus is for use with installations in which the service valve has a receptacle or fitting to receive a pressure gauge. If it is desired to retain the pressure gauge and a liquid level gauge bleeder screw is available, a modified adapter similar to the pressure gauge adapter can be installed temporarily in the bleeder screw receptacle for the leak test and afterwards replaced by the bleeder screw.

Another modified embodiment employs an adapter unit with a manually operable valve installed in the supply conduit and has meter inlet and outlet fittings with Schrader valves therein. When such an adapter is employed, the adapter valve is closed and the service valve opened to bypass gas through the flowmeter. In some circumstances, it may not be desirable to leave a test adapter installed. In such a case, a bypass adapter block is installed in the supply conduit. The bypass adapter has a pair of Schrader valved fittings for connection of the flowmeter and allows gas flow only through the flowmeter to the gas installation when the service valve is opened.

OBJECTS AND ADVANTAGES OF THE INVENTION

The principal objects of the present invention are: to increase safety and economy of fuel gas installations, particularly propane gas installations; to provide systems for quantitatively testing for gas leaks in propane installations; to provide such systems for use particularly by propane service technicians in response to customer reports of propane outages; to provide such systems to enable a technician to efficiently and precisely determine the existence of gas leaks prior to returning a propane installation to service; to provide a propane gas leak testing method including permanent installation of test adapters in the gas supply conduit and service valve, temporary connection of a calibrated flowmeter to the test adapters, bypassing gas through the flowmeter from the propane tank to the gas installation, observation of the gas flow rate to the installation after the installation has been charged with gas, and disconnection of the flowmeter from the adapters; to provide such a method which does not require inside access to a household to test for gas leaks therein; to provide such a method which can distinguish quantitatively between gas flow through free standing pilots and actual gas leaks; to provide apparatus for practicing such a method including test adapters which are valved to normally remain closed and adapted to be opened by connection of cooperating connectors of the flowmeter thereto; to provide such an apparatus including a variety of adapters for use of the gas leak test apparatus with various configurations of service valves and supply conduits; and to provide such a gas leak detection system wherein the apparatus is economical to manufacture, wherein the method is efficient and precise in practice, and wherein the system is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a perspective view at a reduced scale of a quick connect flowmeter unit for use in the gas leak detection system.

FIG. 5 is an enlarged sectional view of the flowmeter unit of the gas leak detection system taken on line 5—5 of FIG. 4 and illustrates a pressure regulator and a gas filter incorporated into the flowmeter unit.

FIG. 6 is a side elevational view of a preferred embodiment of the gas leak detection system of the present invention shown in association with a service valve unit of a propane tank.

DETAILED DESCRIPTION OF THE INVENTION

Figure 1:
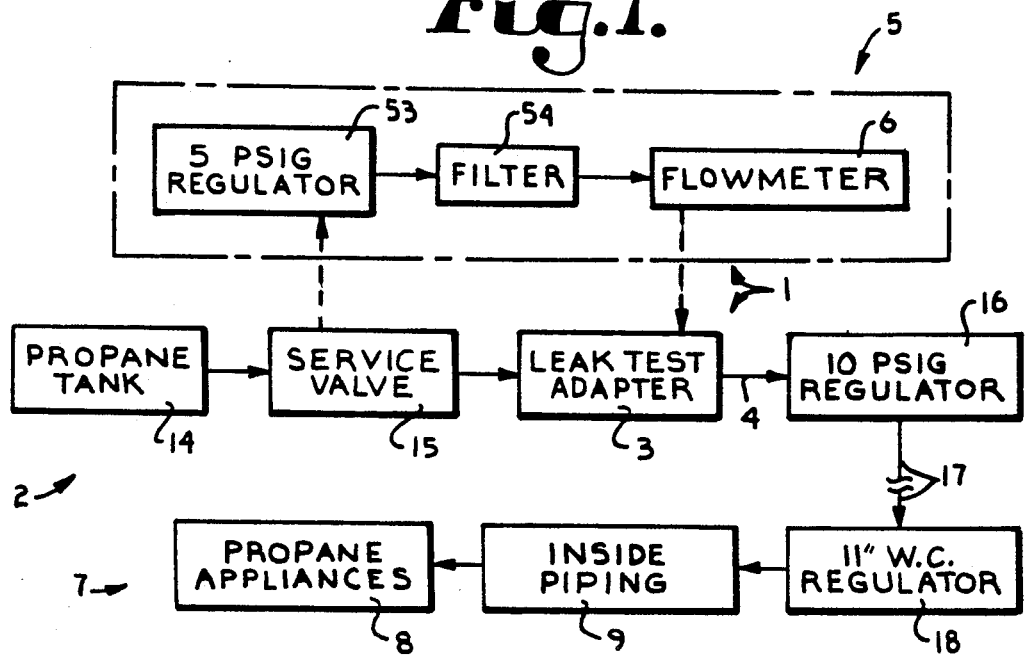
FIG. 1 is a block diagram of a typical propane gas system having a gas leak detection system embodying the present invention incorporated therein.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a propane gas leak detector apparatus embodying the present invention, shown connected to a propane gas delivery system 2. In general, the apparatus 1 includes a leak test adapter 3 permanently installed in a conduit 4 of the system 2 and having a flowmeter unit 5 temporarily connected to the adapter 3. A flowmeter device 6 of the unit 5 quantitatively indicates gas flow into a service installation 7 whereby gas leaks downstream of the flowmeter unit 5 can be determined. The flowmeter unit 5 is disconnected from the adapter 3 after the gas leak test is conducted.

The propane delivery system 2 includes a liquid propane tank 14 having a service valve 15 connected thereto. The service valve 15 is operable to control the flow of propane gas from the tank 14 through the tank conduit 4, a first regulator 16, a delivery conduit 17, and a second regulator 18 to the service installation 7, which term is used herein to indicate the inside piping 9 and the propane appliances 8. The appliances 8 may include one or more of a furnace, a water heater, a stove, or the like. The regulators 16 and 18 are conventional gas pressure regulators and provide propane gas to the appliances 8 at a stabilized pressure which would otherwise vary due to usage load and temperature. The propane gas in the tank 14 may have a pressure ranging from about 10 to 200 psig, depending on the temperature of the liquid propane. The first regulator 16 is mounted on the tank 14 and regulates the pressure in the delivery conduit 17 to about 10 psig. The second regulator 18 is mounted just outside the building (not shown) which houses the appliances 8 and regulates pressure in the inside piping 9 to about 11 inches, water column, which is about one-third pound per square inch.

Referring to FIG. 6, a representative type of propane service valve 15 is illustrated with a main housing 21 which is received in the tank 14 and has a supply nipple 22 extending therefrom. A knob 23 is provided to open and close a valve member (not shown) within the housing 21 to control the flow of gas from the tank 14 to the supply nipple 22. A pressure gauge receptacle 24 communicates with the tank 14 and is adapted to receive a tank pressure gauge (not shown). A liquid level gauge bleeder screw receptacle 25 has a bleeder screw 26 therein which can be opened to test for liquid propane in the tank 14. If a mist issues from the screw 26 when opened, liquid propane is present in the tank 14. In a conventional propane delivery system 2, the tank conduit 4, referred to as a "pigtail", is connected to the supply nipple 22 and transfers gas therefrom to the first regulator 16.

In the practice of the present invention, the test adapter 3 is connected between the supply nipple 22 and the pigtail 4. The original pigtail 4 is replaced by a new I shorter one which better accommodates the adapter 3 and avoids the possibility of introducing debris from 13 disconnection of the pigtail 4 into the delivery system 2 which might clog the regulators 16 and 18. The adapter 3, illustrated in FIG. 6, is a hexagonal block similar to pressure gauge test blocks which are commercially available. The adapter 3 receives an inlet union 29 at an inlet end 30 to connect to the supply nipple 22 and an outlet union 31 at an outlet end 32 of the adapter block 3 to connect to the pigtail 4. The inlet union 20 has male POL (Prestolite) threads, designated as 0.885-14 NGO-LH-Ext and CGA #510 connection, at an end which is received in cooperating female threads in the supply nipple 22, and 0.25 inch MNPT threads (male National Pipe Threads) at an end received in the adapter block 3. The outlet end 32 of the adapter block 3 has female POL threads of the same size as the POL threads of the inlet union 29 to receive the male POL threads of the outlet union 31 therein.

The adapter block 3 has an axial bore or passage 34 therethrough which communicates between the unions 20 and 3 and a radial bore or passage 35 communicating with the passage 34 and having 0.125 inch FNPT threads (female NPT) therein. The threaded passage 35 receives a meter outlet fitting 37 which is one of several similar types of fittings 38 used in the embodiments of the leak detector apparatus 1 of the present invention.

Figure 2:
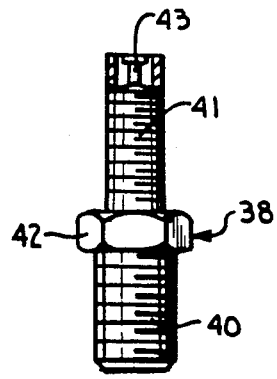
FIG. 2 is an enlarged side elevational view of a valved test adapter for use in the gas leak detection system with a portion broken away to illustrate a valve plunger.

FIG. 2 illustrates a generic fitting 38 which is generally a double male union having a mounting end 40, an opposite valve end 41, and a hexagonal nut 42. Variations of the fitting 38 in the present invention only differ by the size of the threads of the mounting end 40. The valve end 41 of each fitting 38 has male 0.305"-32 size threads and internally receives a Schrader type valve, represented in FIG. 2 by a Schrader valve plunger 43. A Schrader valve is the type of valve conventionally provided in the valve stems of automotive tires and, in the present invention, is manufactured of materials which are appropriate for use with propane gas. The Schrader valve 43 is resiliently held normally closed and is opened by inward movement of the plunger, such as by the threading of a cooperating connector onto the valve end.

The meter outlet fitting 37 has 0.125 inch MNPT threads on the mounting end thereof. A meter inlet fitting 45, similar to the fitting 38, is received in the pressure gauge receptacle 24 and has 0.25 inch MNPT threads on the mounting end thereof.

Figure 3:
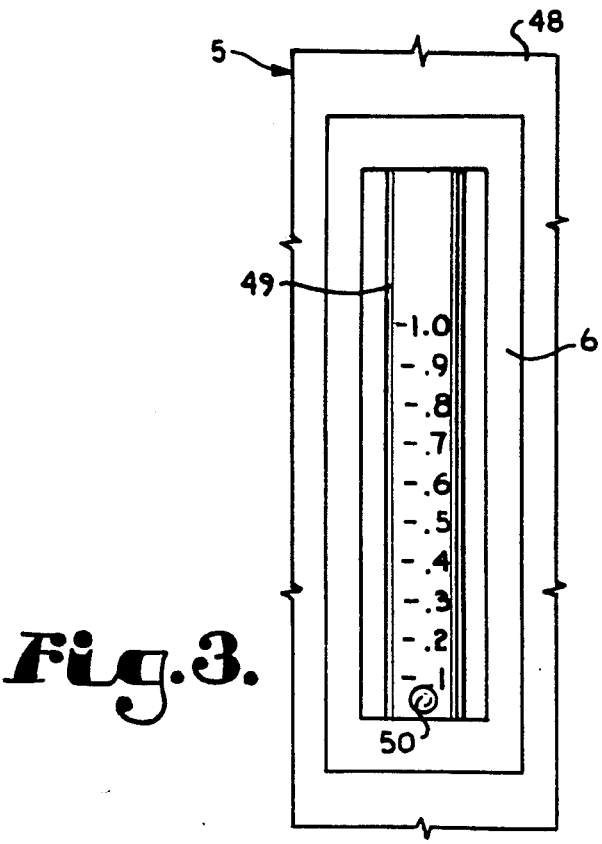
FIG. 3 is a side elevational view of a type of calibrated flowmeter device for use in the gas leak detection system of the present invention.

Referring to FIGS. 1, 3, 4, and 5, the flowmeter unit 5 includes a housing 48 having the flowmeter device 6 mounted therein. The flowmeter device 6 is preferably of the rotameter type including an elongated transparent metering tube 49 with a spherical float or ball 50 movable therein (FIG. 3). Although not illustrated, an internal bore through the tube 49 has an increasing cross sectional area from bottom to top such that with gas flowing from bottom to top, the height of the float 50 is proportional to the volumetric flow rate of the gas. During flow tests, the tube 49 is oriented vertically so that the pressure of the flowing gas acts against the weight of the float 50 without the interference of friction of the float 50 against the sides of the tube 49. In the present invention, the metering tube 49 is calibrated specifically to propane gas at 5 psig inlet pressure in increments of 0.1 standard cubic feet per hour.

Referring to FIG. 5, the flowmeter device 6 has an inlet 51 and an outlet 52. A pressure regulator 53 regulates pressure in the metering tube 49 to 5 psig and is connected to the meter inlet 51. An in-line filter 54 with a twenty micron mesh connects an inlet hose 55 to the pressure regulator 53. An outlet hose 56 is connected to the meter outlet 52. Preferably, the hoses 55 and 56 are of different colors, labeled, or both to distinguish the hoses to ensure that a technician connects the hoses properly for gas leak tests. The hoses 55 and 56 have respective screw-on Schrader connectors 57 and 58 on the ends thereof which, when connected to the fittings 45 and 37, open the Schrader valves 43 therein. The flowmeter unit 5 is fitted into a carrying case 59 to protect the unit 5 when not in use.

In a preferred embodiment of the method of the present invention, a propane delivery technician connects the adapter block 3 to the supply nipple 22, connects the pigtail 4 to the adapter block 3, and installs the meter inlet fitting 45 in the pressure gauge receptacle 24. Preferably, the tank 14 is empty when the meter inlet fitting is installed to prevent loss of propane through the receptacle 24, although it is not required that the tank 14 be empty. The knob 23 is rotated to close the service valve unit 15, and the tank 14 is at least partially filled with liquid propane. The meter inlet and outlet connectors 57 and 58 are connected respectively to the meter inlet and outlet fittings 45 and 37 to connect the flowmeter unit 5 to the propane delivery system, thereby opening the Schrader valves in the fittings 45 and 37. Propane gas flows through the flowmeter device 6 to the installation 7, bypassing the service valve unit 15.

Initially, the flow rate as observed by the float 50 in the metering tube 49 is high as the service installation 7 is charged with propane to 5 psig in the delivery conduit 17, as regulated by the flowmeter regulator 53. When the installation 7 has been charged, the float 50 settles to a steady state position which can be read against the graduation marks on the metering tube 49 of the flowmeter device 6. By these means, the technician can measure the flow of propane downstream of the flowmeter unit 5.

A low flow rate may indicate the presence of free standing pilots in the appliances 8 or a small gas leak which does not present a safety problem. Higher levels of gas flow may indicate unacceptable gas leaks in the installation 7, but may also be a result of a gas valve on an appliance 8 which was left open after propane gas was exhausted. If access to the residence housing the installation 7 is possible, all gas valves can be checked to resolve this question. Maximum levels of acceptable gas leakage may vary according to local codes and the policies of the propane supplier. If the measured leakage is below the maximum acceptable level, the system 2 can be restored to normal service. Alternatively, if the flowmeter unit 5 indicates a flow rate in excess of the acceptable level, the service valve unit 15 remains closed, and the system 2 should be secured to prevent use of propane in the appliances 8 until the leaks are diagnosed and corrected.

The flowmeter unit 5 is disconnected from the fittings 45 and 37 after the leak test, thereby shutting off the flow of gas to the installation 7 until the valve 15 is opened. The adapter block 3 and the fitting 45 are left in place so that the flowmeter unit 5 can be quickly connected thereto the next time a gas leak test is necessary. Internal access to the residence receiving the propane gas is not necessary, although it is helpful in situations where gas leaks are discovered.

Figure 9:
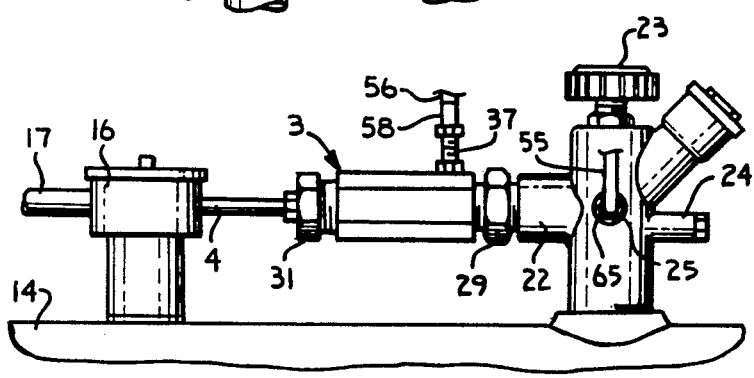
FIG. 9 is a view similar to FIG. 6 and illustrates a second modified embodiment of the gas leak detection system of the present invention.

FIG. 9 illustrates a variation of the invention using the adapter 3. In the embodiment shown in FIG. 9, the bleeder screw 26 is removed from the bleeder screw receptacle 25, and a meter inlet fitting 65 is threaded thereinto. The meter inlet hose 55 is connected to the fitting 65 to conduct the gas leak test. The fitting 65 is similar to the fitting 45 except that an inlet end of the fitting 65 is sized and threaded at 0.375"-24 UNF. After the leak test is conducted and the flowmeter unit 5 is disconnected from the inlet and outlet fittings 65 and 37, the fitting 65 is removed from the receptacle 25, and the bleeder screw 26 is replaced therein. Otherwise, gas leak tests using the fitting 65 are substantially similar to tests using the meter inlet fitting 45.

Figure 7:
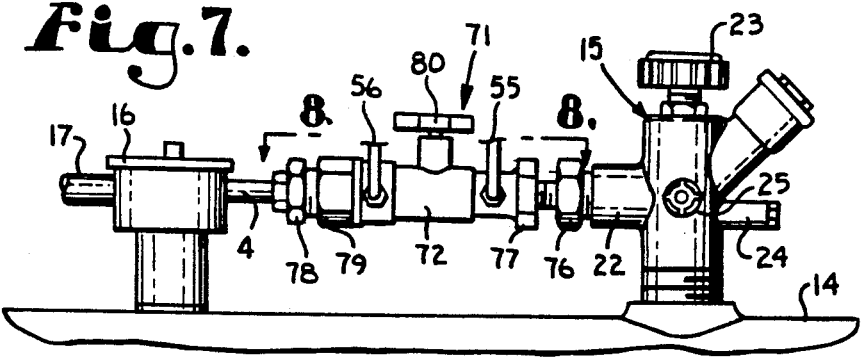
FIG. 7 is a view similar to FIG. 6 and illustrates a first modified embodiment of the gas leak detection system of the present invention.
Figure 8:
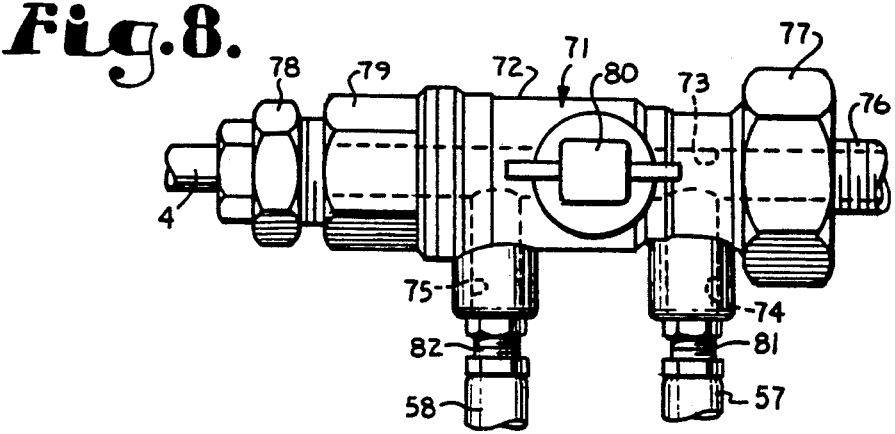
FIG. 8 is an enlarged plan sectional view taken on line 8—8 of FIG. 7 and illustrates details of an adapter unit of the first modified embodiment which incorporates an integral test adapter valve.

FIGS. 7 and 8 illustrate a modified embodiment of the gas leak test adapter 71 of the present invention. The unit 71 includes an adapter body 72 having an axial passage 73 therethrough with a radial meter inlet passage 74 and a radial meter outlet passage 75 communicating therewith. An inlet union 76 connects an inlet end 77 of the adapter body 72 to the supply nipple 22 of the service valve unit 15, while an outlet union 78 connects an outlet end 79 to the pigtail 4. The unions 76 and 78 are similar respectively to the unions 29 and 31 of the adapter 3. An adapter valve knob 80 connects to an adapter valve member (not shown) within the axial passage 73 and controls the flow of gas therethrough. A meter inlet fitting 81 is threaded into the inlet passage 74, and a meter outlet fitting 82 is threaded into the outlet passage 75. The fittings 81 and 82 are both similar to the fitting 37 of the adapter 3 and have Schrader valves therein.

The adapter unit 71 is permanently installed between the supply nipple 22 and the pigtail 4. When it is desired to conduct a gas leak test using the adapter unit 71, the tank 14 must be at least partially filled. The flowmeter unit 5 is connected to the adapter unit 71 by connection of the inlet and outlet connectors 57 and 58 respectively to the inlet and outlet fittings 81 and 82. The adapter valve knob 80 is turned to a closed position, and the service valve unit 15 is opened to bypass gas from the tank 14 to through the flowmeter device 6 to the service installation 7. After the leak test is conducted, the flowmeter unit 5 is disconnected from the adapter unit 71, and the adapter valve knob 80 is turned to an open position to allow propane gas to flow to the installation 7 if the test determined that less than a predetermined rate of leakage was occurring. Use of the adapter unit 71 does not require connection of the flowmeter unit 5 to either the pressure gauge receptacle 24 or the bleeder screw receptacle 25.

Figure 10:
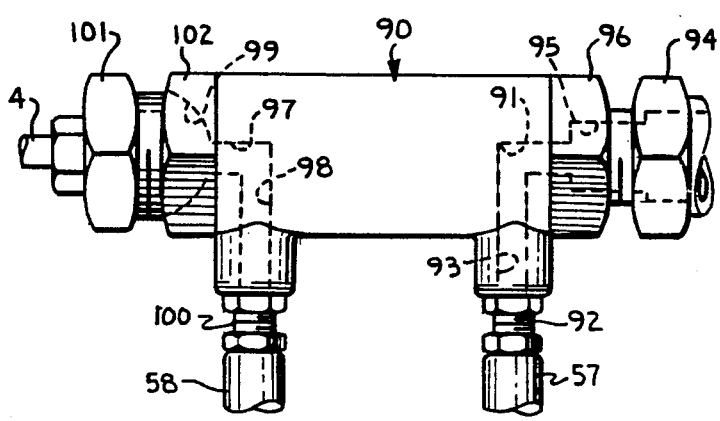
FIG. 10 is an enlarged top plan view of a test adapter unit for a third modified embodiment of the gas leak detection system of the present invention.

FIG. 10 illustrates a modified embodiment 90 of the gas leak detector test adapter of the present invention which can be used when it is not desirable to leave the test adapters permanently connected in the system 2. The adapter 90 has an inlet passage 91 formed therein to threadedly receive a meter inlet fitting 92 in a radial leg 93 thereof. An inlet union 94 is received in an axial leg 95 of the passage 91 at an inlet end 96 of the adapter 90. An outlet passage 97 has a radial leg 98 and an axial leg 99. A meter outlet fitting 100 is threaded into the radial leg 98, and an outlet union 101 is threaded into the axial leg 99 at an outlet end 102 of the adapter 90. The meter inlet and outlet fittings 92 and 100 are substantially similar to the fitting 37 of the adapter 3 and have Schrader valves therein. The unions 94 and 101 are substantially similar to the unions 29 and 31.

The inlet union 94 provides for connection of the adapter 90 to the supply nipple 22 of the service valve unit 15, while the outlet union 101 is connected to the pigtail 4. The meter inlet and outlet connections 57 and 58 of the flowmeter unit 5 are connected respectively to the fittings 92 and 100 to bypass gas from the tank 14 through the flowmeter unit 5 to the service installation 7 to conduct the gas leak test. After the test is conducted, the flowmeter unit 5 is disconnected from the adapter 90, the adapter 90 is disconnected from the nipple 22 and the pigtail 4, and the pigtail 4 is reconnected to the nipple 22 of the service valve unit 15.

The present invention, thus, provides methods and apparatus for testing propane gas installations for leaks which can be performed quickly and precisely. Once the test adapter 3 or 71 is installed, thereafter, a service technician need only connect the flowmeter unit 5 to the adapter 3 or 71 to conduct a gas leak test. While the present invention has been described principally for use in propane gas delivery systems 2, it is also applicable with minor modifications to natural gas systems.

It is to be understood that while certain forms of the present invention have been illustrated and described herein, it is not to be limited to the specific forms or arrangement of parts described and shown.

What is claimed and desired to be secured to Letters Patent is as follows:

1. A method of testing for a gas leak in a gas service installation receiving gas from a gas source through a supply conduit, said method comprising the steps of:
   (a) installing test adapter means having inlet and outlet fittings in said conduit;
   (b) temporarily connecting calibrated flowmeter means to said inlet and outlet fittings of said adapter means;
   (c) bypassing gas from said source to said installation through said flowmeter means and downstream to said gas service installation to test for a gas leak at said service installation exceeding a predetermined rate; and
   (d) disconnecting said flowmeter means from said inlet and outlet fittings of said adapter means after testing for said gas leak, but leaving said inlet and outlet fittings for future leak testing by temporarily reconnecting said calibrated flowmeter means.

2. A method of testing for a gas leak in a gas service installation receiving gas from a gas source through a supply conduit, said method comprising the steps of:
   (a) installing in said conduit test adapter means with at least one valved fitting which is opened by connection thereto of a cooperating fitting and which is closed by disconnection of said cooperating fitting therefrom;
   (b) temporarily connecting to said adapter means calibrated flowmeter means having a cooperating fitting which opens said valved fitting of said adapter means;
   (c) bypassing gas from said source to said installation through said flowmeter means to test for a gas leak exceeding a predetermined rate; and
   (d) disconnecting said flowmeter means from said adapter means after testing for said gas leak.

3. A method as set forth in claim 2 and including the step of:
   (a) permanently installing said test adapter means in said conduit.

4. A method as set forth in claim 2 wherein a pressure regulator is installed in said conduit, and including the step of:
   (a) installing said adapter means in said conduit upstream of said pressure regulator.

5. A method as set forth in claim 2 and including the step of:
   (a) regulating gas pressure from said conduit to said flowmeter means to a selected flowmeter pressure.

6. A method of testing for a gas leak in a gas service installation receiving gas from a gas source through a supply conduit having source valve means installed therein and including a valve member operable to control the flow of gas through said conduit and a receptacle communicating with said source, said method comprising the steps of:
   (a) installing a first adapter member in said receptacle, said first adapter member including a valved meter inlet fitting communicating with said source;
   (b) permanently installing a second adapter member in said conduit downstream of said valve member, said second adapter member including a valved meter outlet fitting communicating with said conduit downstream of said valve member;
   (c) temporarily connecting calibrated flowmeter means to said meter inlet fitting and said meter outlet fitting to enable bypassing gas through said flowmeter means;
   (d) bypassing gas from said source to said installation through said flowmeter means by closing said valve member to test for a gas leak exceeding a predetermined rate; and
   (e) disconnecting said flowmeter means from said meter inlet fitting and said meter outlet fitting after testing for said gas leak.

7. A method as set forth in claim 6 and including the step of:
   (a) permanently installing said first adapter member in said receptacle.

8. A method of testing for a gas leak in a gas service installation receiving gas from a gas source through a supply conduit, said method comprising the steps of:
   (a) permanently installing test adapter means in said conduit, said adapter means including a valved meter inlet fitting and a valved meter outlet fitting, said meter inlet fitting and said meter outlet fitting communicating respectively with said source and said installation;
   (b) temporarily connecting calibrated flowmeter means to said meter inlet and outlet fittings of said adapter means;
   (c) bypassing gas from said source to said service installation through said flowmeter means;
   (d) observing said flowmeter means to determine if gas flow therethrough exceeds a predetermined rate;
   (e) discontinuing said bypassing step after observing a gas flow rate through said flowmeter means; and
   (f) disconnecting said flow meter means from said meter inlet and outlet fittings of said adapter means.

9. A method as set forth in claim 8 wherein source valve means is installed in said conduit, includes a valve member operable to control the flow of gas through said conduit, and includes a receptacle communicating with said source, and including the steps of:
   (a) installing a first adapter member in said receptacle, said first adapter member including a valved meter inlet fitting communicating with said source;
   (b) permanently installing a second adapter member in said conduit downstream of said valve member, said second adapter member including a valved meter outlet fitting communicating with said conduit downstream of said valve member;
   (c) temporarily connecting said flowmeter means to said meter inlet fitting and said meter outlet fitting to bypass said gas through said flowmeter means;
   (d) closing said valve member to bypass gas from said source to said installation through said flowmeter means; and
   (e) disconnecting said flowmeter means from said meter inlet fitting and said meter outlet fitting after testing for said gas leak.

10. A method as set forth in claim 8 wherein said gas source is a propane tank including a service valve unit connecting said tank to said conduit; said valve unit including a service valve member operable to control the flow of gas through said conduit and a tank pressure meter receptacle communicating with said tank and adapted to receive a pressure meter therein, and including the steps of:
    (a) permanently installing a first adapter member in said pressure meter receptacle, said first adapter member including said meter inlet fitting having a meter inlet valve which is opened upon connection thereto of a cooperating connector of said flowmeter means;
    (b) permanently installing a second adapter member in said conduit downstream of said service valve member, said second adapter member including said meter outlet fitting having a meter outlet valve which is opened upon connection thereto of a cooperating connector of said flowmeter means;
    (c) temporarily connecting said flowmeter means to said meter inlet fitting and said meter outlet fitting thereby opening said meter inlet and outlet valves;
    (d) closing said service valve member to bypass gas from said tank to said installation through said flowmeter means; and
    (e) disconnecting said flowmeter means from said meter inlet fitting and said meter outlet fitting after testing for said gas leak thereby closing said meter inlet and outlet valves.

11. A method as set forth in claim 8 wherein said gas source is a propane tank including a service valve unit connecting said tank to said conduit; said valve unit including a service valve member operable to control the flow of gas through said conduit and a bleeder screw receptacle communicating with said tank and adapted to receive a liquid level gauge bleeder screw therein, and including the steps of:

(a) temporarily installing a first adapter member in said bleeder screw receptacle, said first adapter member including said meter inlet fitting with a meter inlet valve which is opened upon connection thereto of a cooperating connector of said flowmeter means;

(b) permanently installing a second adapter member in said conduit downstream of said service valve member, said second adapter member including said meter outlet fitting having a meter outlet valve which is opened upon connection thereto of a cooperating connector of said flowmeter means;

(c) temporarily connecting said flowmeter means to said meter inlet fitting and said meter outlet fitting thereby opening said meter inlet and outlet valves;

(d) closing said service valve member to bypass gas from said tank to said installation through said flowmeter means;

(e) disconnecting said flowmeter means from said meter inlet fitting and said meter outlet fitting after testing for said gas leak thereby closing said meter inlet and outlet valves;

(f) removing said first adapter from said bleeder screw receptacle; and (g) closing off said bleeder screw receptacle.

12. A method as set forth in claim 8 and including the steps of:

(a) permanently installing said adapter means in said conduit wherein said adapter means includes an inlet communicating with said source, an adapter outlet communicating with said installation, and an adapter valve controlling communication between said adapter inlet and said adapter outlet, said meter inlet fitting communicating with said adapter inlet, and said meter outlet fitting communicating with said adapter outlet;

(b) closing said adapter valve to bypass said gas through said flowmeter means;

(c) opening said adapter valve subsequent to testing for said gas leak to discontinue said bypassing step; and (e) disconnecting said flowmeter means from said meter inlet fitting and said meter outlet fitting.

13. A method as set forth in claim 12 wherein said gas source is a propane tank including a service valve unit connecting said tank to said conduit, said valve unit including a service valve member operable to control the flow of gas through said conduit, and including the steps of:

(a) installing said adapter means in said conduit downstream of said valve member; and (b) opening said service valve member to flow gas through said flowmeter means by way of said adapter means.

14. A method as set forth in claim 8 wherein said gas source is a propane tank connected to said installation by said conduit and testing for said gas leak is in response to exhaustion of propane in said gas tank, and including the step of:

(a) at least partially filling said tank with propane subsequent to installing said adapter means in said conduit.

15. A method as set forth in claim 8 wherein a pressure regulator is installed in said conduit, and including the step of:

(a) installing said adapter means in said conduit upstream of said pressure regulator.

16. A method as set forth in claim 8 and including the step of:

(a) regulating gas pressure from said conduit to said flowmeter means to a selected flowmeter pressure.

17. A method as set forth in claim 8 and including the step of:

(a) filtering gas from said conduit prior to entry into said flowmeter means.

18. An apparatus for testing for a gas leak in a gas service installation receiving gas from a gas source through a supply conduit and comprising:

(a) test adapter means permanently installed in said conduit and having inlet and outlet fittings;

(b) calibrated flowmeter means removably connected to said adapter means by said inlet and outlet fittings; and (c) means for bypassing gas from said source to said installation through said flowmeter means and downstream to said gas service installation to test for a gas leak at said gas service installation exceeding a predetermined rate.

19. An apparatus for testing for a gas leak in a gas service installation receiving gas from a gas source through a supply conduit and comprising:

(a) test adapter means permanently installed in said conduit, said adapter means including at least one valved fitting which is opened by connection of said flowmeter means thereto;

(b) calibrated flowmeter means removably connected to said adapter means; and (c) means for bypassing gas from said source to said installation through said flowmeter means to test for a gas leak exceeding a predetermined rate.

20. An apparatus as set forth in claim 19 wherein said flowmeter means includes:

(a) a rotameter type flowmeter device.

21. An apparatus as set forth in claim 19 wherein said flowmeter means includes:

(a) a meter inlet connector and a meter outlet connector adapted for removable connection to said adapter means; and (b) a flowmeter device flow communicating with said meter inlet and outlet connectors and operative to indicate a rate of flow of gas therethrough.

22. An apparatus as set forth in claim 21 and including:

(a) pressure regulator means flow connected between said meter inlet connector and said flowmeter device and operative to regulate a pressure of gas entering said flowmeter device to a selected pressure.

23. A method of testing for a gas leak in a gas service installation receiving gas from a gas source through a supply conduit, said method comprising the steps of:

(a) permanently installing adapter means in said conduit; said adapter means including an adapter inlet communicating with said source, an adapter outlet communicating with said installation, an adapter valve controlling communication between said adapter inlet and said adapter outlet, a valved meter inlet fitting communicating with said adapter inlet, and a valved meter outlet fitting communicating with said adapter outlet;

(b) temporarily connecting calibrated flowmeter means to said meter inlet fitting and said meter outlet fitting;

(c) bypassing gas from said source to said installation through said flowmeter means by closing said adapter valve to test for a gas leak exceeding a predetermined rate;

(d) opening said adapter valve subsequent to testing for said gas leak; and (e) disconnecting said flowmeter means from said meter inlet fitting and said meter outlet fitting after testing for said gas leak.

24. An apparatus for testing for a gas leak in a gas service installation receiving gas from a gas source through a supply conduit and comprising:

(a) test adapter means permanently installed in said conduit;

(b) calibrated flowmeter means removably connected to said adapter means, said flowmeter means including:

(1) a meter inlet connector and a meter outlet connector adapted for removable connection to said adapter means;

(2) a flowmeter device flow communicating with said meter inlet and outlet connectors and operative to indicate a rate of flow of gas therethrough; and (3) gas filter means flow connected between said meter inlet connector and said flowmeter device; and (c) means for bypassing gas from said source to said installation through said flowmeter means to test for a gas leak exceeding a predetermined rate.

25. An apparatus for testing for a gas leak in a gas service installation receiving gas from a gas source through a supply conduit and comprising:

(a) test adapter means permanently installed in said conduit;

(b) said adapter means including a valved adapter fitting having a Schrader type valve positioned therein;

(c) calibrated flowmeter means removably connected to said adapter means;

(d) said flowmeter means including a meter connector which cooperates with said adapter fitting in such a manner that said Schrader type valve is opened by connection of said meter connector to said adapter fitting; and (e) means for bypassing gas from said source to said installation through said flowmeter means to test for a gas leak exceeding a predetermined rate.

26. An apparatus for testing for a gas leak in a gas service installation receiving gas from a gas source through a supply conduit and comprising:

(a) test adapter means permanently installed in said conduit;

(b) calibrated flowmeter means removably connected to said adapter means;

(c) means for bypassing gas from said source to said installation through said flowmeter means to test for a gas leak exceeding a predetermined rate; and (d) said means for bypassing gas including said adapter means having an adapter valve operable between an open position providing communication of gas from said source to said installation and a closed position blocking said communication, whereby gas is bypassed from said source to said installation through said flowmeter means when said flowmeter means is connected to said adapter means and said adapter valve is operated to said closed position.

* * * * *